(12) United States Patent
Hayek et al.

(10) Patent No.: US 9,052,902 B2
(45) Date of Patent: Jun. 9, 2015

(54) TECHNIQUES TO TRANSMIT COMMANDS TO A TARGET DEVICE TO REDUCE POWER CONSUMPTION

(75) Inventors: George R. Hayek, El Dorado Hills, CA (US); Todd M. Witter, Orangevale, CA (US); Seh W. Kwa, Saratoga, CA (US); Maximino Vasquez, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 12/890,217

(22) Filed: Sep. 24, 2010

(65) Prior Publication Data

US 2012/0079295 A1 Mar. 29, 2012

(51) Int. Cl.
| | |
|---|---|
| *G06F 13/14* | (2006.01) |
| *G06F 1/32* | (2006.01) |
| *G09G 5/00* | (2006.01) |
| *G09G 5/395* | (2006.01) |

(52) U.S. Cl.
CPC ............ *G06F 1/3265* (2013.01); *G06F 1/3218* (2013.01); *G06F 1/3287* (2013.01); *G09G 5/006* (2013.01); *G09G 5/395* (2013.01); *Y02B 60/1242* (2013.01); *G09G 2330/021* (2013.01); *G09G 2360/18* (2013.01); *G09G 2370/04* (2013.01); *G09G 2370/10* (2013.01); *G09G 2370/14* (2013.01)

(58) Field of Classification Search
CPC ..... H04L 1/0061; H03M 13/09; G06F 1/3265
USPC ..................... 713/322, 300; 375/240.28, 376; 711/101; 345/204, 87, 214, 520, 212; 714/758; 348/222.1
See application file for complete search history.

(56) References Cited

U.S. PATENT DOCUMENTS

| | | | |
|---|---|---|---|
| 5,919,263 A | 7/1999 | Kikinis et al. | |
| 7,017,053 B2 | 3/2006 | Mizuyabu et al. | |
| 7,558,264 B1 | 7/2009 | Lolayekar et al. | |
| 7,610,433 B2 * | 10/2009 | Randell et al. | 711/101 |
| 7,839,860 B2 | 11/2010 | Kobayashi | |
| 7,864,695 B2 | 1/2011 | Morinaga et al. | |
| 7,966,436 B2 * | 6/2011 | Suh et al. | 710/106 |
| 8,068,485 B2 * | 11/2011 | Kobayashi | 370/389 |
| 8,111,799 B2 * | 2/2012 | Lee et al. | 375/376 |
| 8,179,984 B2 * | 5/2012 | Luo et al. | 375/240.28 |

(Continued)

FOREIGN PATENT DOCUMENTS

| | | | |
|---|---|---|---|
| CN | 101159128 A | 4/2008 | |
| CN | 101345039 A | 1/2009 | |

(Continued)

OTHER PUBLICATIONS

VESA DisplayPort Standard Version 1, Revision 1a; Jan. 11, 2008.*

(Continued)

*Primary Examiner* — Thomas Lee
*Assistant Examiner* — Aurel Prifti
(74) *Attorney, Agent, or Firm* — Glen B Choi (57) ABSTRACT

Techniques are described to transmit commands to a display device. The commands can be transmitted in header byte fields of secondary data packets. The commands can be used to cause a target device to capture a frame, enter or exit self refresh mode, or reduce power use of a connection. In addition, a request to exit main link standby mode can cause the target enter training mode without explicit command to exit main link standby mode.

14 Claims, 5 Drawing Sheets

(56) References Cited

U.S. PATENT DOCUMENTS

| | | | |
|---|---|---|---|
| 8,275,999 B2 * | 9/2012 | Wu | 713/300 |
| 8,704,839 B2 * | 4/2014 | Kobayashi | 345/545 |
| 8,823,721 B2 * | 9/2014 | Vasquez et al. | 345/534 |
| 8,854,344 B2 * | 10/2014 | Glen | 345/204 |
| 2002/0024489 A1 * | 2/2002 | Koyama et al. | 345/87 |
| 2006/0080563 A1 * | 4/2006 | Perozo et al. | 713/322 |
| 2006/0082570 A1 | 4/2006 | Noorbakhsh et al. | |
| 2006/0082587 A1 | 4/2006 | Noorbakhsh et al. | |
| 2007/0091359 A1 | 4/2007 | Suzuki et al. | |
| 2007/0150616 A1 | 6/2007 | Baek et al. | |
| 2008/0008172 A1 | 1/2008 | Kobayashi | |
| 2008/0079739 A1 * | 4/2008 | Gupta et al. | 345/520 |
| 2008/0094481 A1 * | 4/2008 | Rai | 348/222.1 |
| 2008/0106544 A1 * | 5/2008 | Lee et al. | 345/214 |
| 2008/0143695 A1 * | 6/2008 | Juenemann et al. | 345/204 |
| 2008/0273602 A1 * | 11/2008 | Glen | 375/257 |
| 2008/0316197 A1 * | 12/2008 | Ds | 345/212 |
| 2009/0125940 A1 | 5/2009 | Kim et al. | |
| 2009/0158377 A1 | 6/2009 | Diab et al. | |
| 2009/0204840 A1 * | 8/2009 | Sakamoto et al. | 713/340 |
| 2010/0080218 A1 * | 4/2010 | Kwa et al. | 370/389 |
| 2010/0087932 A1 | 4/2010 | McCoy et al. | |
| 2010/0123727 A1 | 5/2010 | Kwa et al. | |
| 2010/0164968 A1 | 7/2010 | Kwa et al. | |
| 2011/0078536 A1 * | 3/2011 | Han et al. | 714/758 |
| 2011/0157202 A1 * | 6/2011 | Kwa et al. | 345/547 |
| 2011/0185204 A1 * | 7/2011 | Louboutin et al. | 713/320 |
| 2011/0196998 A1 * | 8/2011 | Kwa et al. | 710/106 |

FOREIGN PATENT DOCUMENTS

| | | |
|---|---|---|
| CN | 101715119 A | 5/2010 |
| JP | 10-105132 A | 4/1998 |
| JP | 2001-016221 A | 1/2001 |
| JP | 2001-016222 A | 1/2001 |
| JP | 2005-027120 A | 1/2005 |
| JP | 2006-268738 A | 10/2006 |
| JP | 2008-084366 A | 4/2008 |
| JP | 2008-109269 A | 5/2008 |
| JP | 2008-182524 A | 8/2008 |
| JP | 2010-102702 A | 5/2010 |
| JP | 2010-156970 A | 7/2010 |
| KR | 10-2007-0021799 A | 2/2007 |
| TW | 243523 | 3/1995 |
| TW | 200746782 A | 12/2007 |
| WO | 2012/040697 A2 | 3/2012 |
| WO | 2012/040697 A3 | 6/2012 |

OTHER PUBLICATIONS

Video Electronics Standards Association, VESA DisplayPort Standard, "Section 2.2.5 Secondary-data Packing Formats," Version 1, Revision 1a, Jan. 11, 2008, pp. 71-83.
International Search Report & Written Opinion for PCT Application No. PCT/US2011/053237, mailed Apr. 24, 2012, 10 pages.
"Section 2.2.5.4 Extension Packet", VESA DisplayPort Standard, Video Electronics Standards Association, Version 1, Revision 1a, Jan. 11, 2008, pp. 1 and 81-83.
Panel Standardization Working Group, "Industry Standard Panels for Monitors-15.0-inch", Mounting and Top Level Interface Requirements, Panel Standardization Working Group, version 1.1, Mar. 12, 2003, pp. 1-19.
Office Action received for Chinese Patent Application No. 200910221453.6, mailed Oct. 10, 2011, 8 pages, including 4 pages of English translation.
"VESA DisplayPort Standard", Video Electronics Standards Association (VESA), Version 1.1a, Jan. 11, 2008, 5 pages.
Office Action received for Korean Patent Application No. 10-2009-0092283, mailed Oct. 27, 2011, 5 pages, including 2 pages of English translation.
"VESA Embedded DisplayPort (eDP)", VESA eDP Standard, VESA eDP Standard, Video Electronics Standards Association, Version 1, Dec. 22, 2008, pp. 1-23.
"VESA Embedded DisplayPort (eDP) Standard", VESA eDP Standard, Video Electronics Standards Association, Version 1.1, Oct. 23, 2009, pp. 1-32.
"VESA Embedded DisplayPort Standard", eDP Standard, Video Electronics Standards Association, Version 1.2, May 5, 2010, pp. 1-53.
Office Action received in Japanese Patent Application No. 10-2009-222990, mailed on Aug. 2, 2011, 4 pages, including 2 pages of English translation.
Office Action received for Korean Patent Application No. 10-2009-111387, mailed Mar. 9, 2011, 9 pages, including 4 pages of English translation.
"VESA Embedded DisplayPort Standard", Video Electronics Standards Association (VESA), Version 1.3, Jan. 13, 2011, pp. 1-81.
Office Action received for Korean Patent Application No. 10-2009-0092283, mailed Feb. 12, 2011, 5 pages, including 2 pages of English translation.
Office Action received in Korean Patent Application No. 10-2009-92283, mailed Apr. 9, 2012, 8 pages, including 4 pages of English translation.
Non-Final Office Action received in U.S. Appl. No. 12/286,192, mailed Apr. 29, 2010, 6 pages.
Non-Final Office Action received in U.S. Appl. No. 13/089,731, mailed Jul. 22, 2011, 6 pages.
Non-Final Office Action received in U.S. Appl. No. 13/349,276, mailed Jul. 2, 2012, 6 pages.
Office Action received in Korean Patent Application No. 10-2009-92283, mailed Oct. 31, 2012, 7 pages of Office Action including 4 pages of English translation.
Office Action received in Chinese Patent Application No. 200910221453.6, mailed Jul. 23, 2012, 5 pages of Office Action including 2 pages of English translation.
Search Report Received in Taiwan Patent Application No. 98132686, mailed Dec. 26, 2012, 19 pages of Taiwanese Office Action and 1 page of English Translation of Search Report and 6 pages of English Translation of Office Action.
International Preliminary Report on Patentability for PCT Application No. PCT/US2011/053237, mailed on Apr. 4, 2013, 5 pages.
Office Action Received for Japanese Patent Application No. 2013-530388, mailed on Apr. 1, 2014, 3 Pages of Japanese Office Action and 3 Pages of English Translation.
Office Action Received for Korean Patent Application No. 2013-7008235, mailed on May 1, 2014, 1 Page of English Translation only.
Office Action Received in Japanese Patent Application No. 2012-031772, mailed on May 14, 2013, 2 pages of English Translation and 2 pages of Office Action.
Office Action Received in Chinese Patent Application No. 201180002742.2, mailed on Dec. 20, 2013, 8 pages of English Translation and 7 pages of Office Action.
Office Action Received in Taiwan Patent Application No. 98132686, mailed on Nov. 5, 2013, 1 page of English Translation and 5 pages of Office Action.
Office Action Received in Chinese Patent Application No. 201180002742.2, mailed on Jul. 15, 2014, 7 pages of English Translation and 7 pages of Office Action.
VESA DisplayPort Standard, Video Electronics Standards Association, Version 1, Revision 1a, Jan. 11, 2008, 238 pages.
Office Action Received for Korean Patent Application No. 2013-7008235, mailed on Nov. 27, 2014, 3 Pages of Korean Office Action and 1 Page Of English Translation.
Office Action Received for Chinese Patent Application No. 201180002742.2, mailed on Jan. 21, 2015, 9 Pages of Chinese Office Action and 8 Page Of English Translation.
Office Action Received for Korean Patent Application No. 10-2014-7036634, mailed on Mar. 26,2015, 3 Pages of Korean Office Action and 1 Page of Enlgish transaltion.

* cited by examiner

TECHNIQUES TO TRANSMIT COMMANDS TO A TARGET DEVICE TO REDUCE POWER CONSUMPTION

RELATED APPLICATION

This application is related to co-pending U.S. patent application Ser. No. 12/286,192, entitled "Protocol Extensions in a Display Port Compatible Interface," inventors Kwa et al., filed Sep. 29, 2008.

FIELD

The subject matter disclosed herein relates generally to techniques for regulating power consumption.

RELATED ART

Multimedia operations in computer systems are very common. For example, personal computers are often used to process and display video. Power consumption by computers is a concern. It is desirable to regulate power consumption by personal computers.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
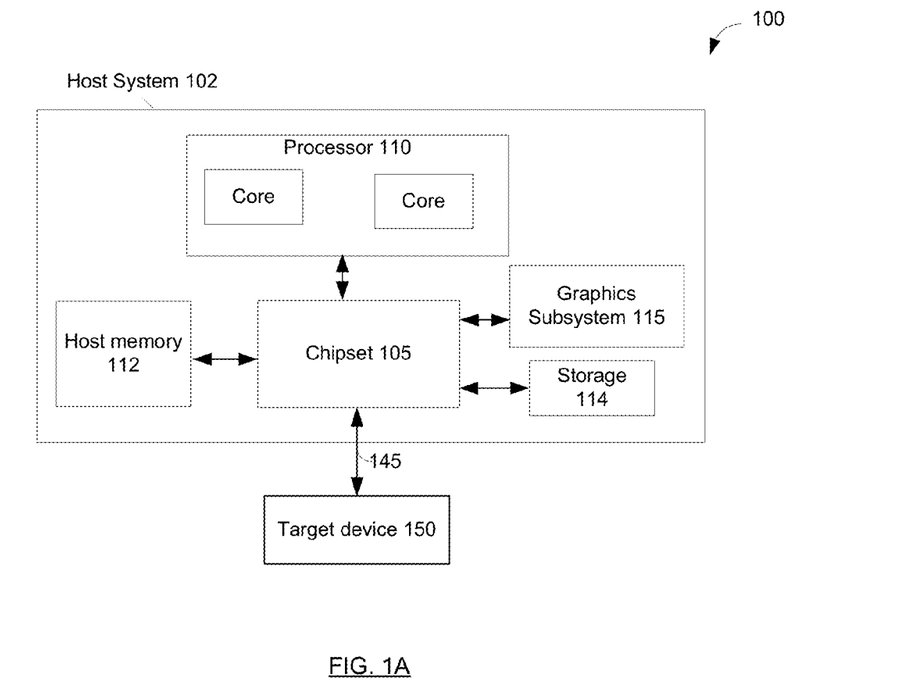
FIG. 1A depicts a system in accordance with an embodiment.

FIG. 1A depicts a system 100 in accordance with an embodiment. System 100 may include a source device such as a host system 102 and a target device 150. Host system 102 may include a processor 110 with one or more cores, host memory 112, storage 114, and graphics subsystem 115. Chipset 105 may communicatively couple devices in host system 102. Graphics subsystem 115 may process video and audio. System 100 can be implemented in a handheld personal computer, mobile telephone, set top box, or any computing device. Any type of user interface is available such as a keypad, mouse, and/or touch screen.

In accordance with various embodiments, processor 110 may execute a software driver (not depicted) that determines whether to (1) instruct target device 150 to capture an image and repeatedly display the captured image, (2) power down components of graphics subsystem 115, and (3) power down components of target device 150. The driver may determine whether to initiate actions (1), (2), or (3) based at least on: a change in the system timer period, triangle or polygon rendering, any processor core is not in low power mode, any mouse activity, vertical blanking interrupts are used, and/or overlay is enabled. For example, powering down components may involve reducing voltage regulators to the lowest operating voltage level. For example, when the processor 110 executes a Microsoft Windows compatible operating system, the driver may be a kernel mode driver.

For example, host system 102 may transmit commands to target device 150 using interface 145. In some embodiments, interface 145 may include a Main Link and an AUX channel, both described in Video Electronics Standards Association (VESA) DisplayPort Standard, Version 1, Revision 1a (2008) as well as revisions and variations thereof. In various embodiments, host system 102 (e.g., graphics subsystem 115) may form and transmit communications to target device 150 at least in a manner described with respect to co-pending U.S. patent application having Ser. No. 12/286,192, entitled "Protocol Extensions in a Display Port Compatible Interface," inventors Kwa et al., filed Sep. 29, 2008.

Target device 150 may be a display device with capabilities to display visual content and/or render audio content. For example, target device 150 may include control logic such as a timing controller (TCON) that controls writing of pixels as well as a register that directs operation of target device 150. Target device 150 may have access to a memory or frame buffer from which to read frames for display.

Various embodiments include the capability to transmit secondary data packets over interface 145 to target device 150. Secondary data packets can be used to command target device 150.

Figure 1B:
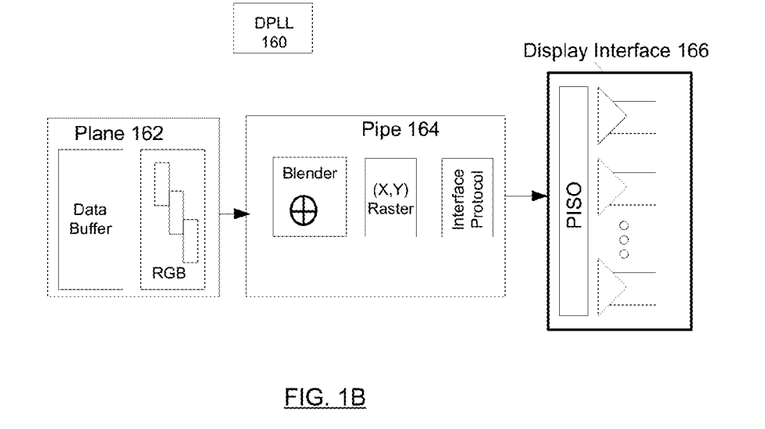
FIG. 1B depicts an example of components of a host system whose power consumption can be controlled, in accordance with an embodiment.

FIG. 1B depicts an example of components of host system 102 whose power consumption can be controlled (e.g., power consumption decreased or increased), in accordance with an embodiment. The components can be in a chipset, processor, or graphics subsystem. For example, the display phase lock loop (PLL) 160, display plane 162, display pipe 164, and display interface 166 of host 102 can be powered down or up. PLL 160 may be a system clock for the display plane 162, display pipe 164, and/or display interface 166. For example, display plane 162 may include a data buffer and RGB color mapper, which transforms data from buffer to RGB. Display plane 162 may include an associated memory controller and memory input/output (IO) (not depicted) that could also be power managed. Pipe 164 may include a blender of multiple layers of images into a composite image, X, Y coordinate rasterizer, and interface protocol packetizer. The interface protocol packetizer may be compliant at least with Display Port or Low-voltage differential signaling (LVDS), available from ANSI/TIA/EIA-644-A (2001), as well as variations thereof. Display interface 166 may include a DisplayPort or LVDS compatible interface and a parallel-in-serial-out (PISO) interface.

Figure 1C:
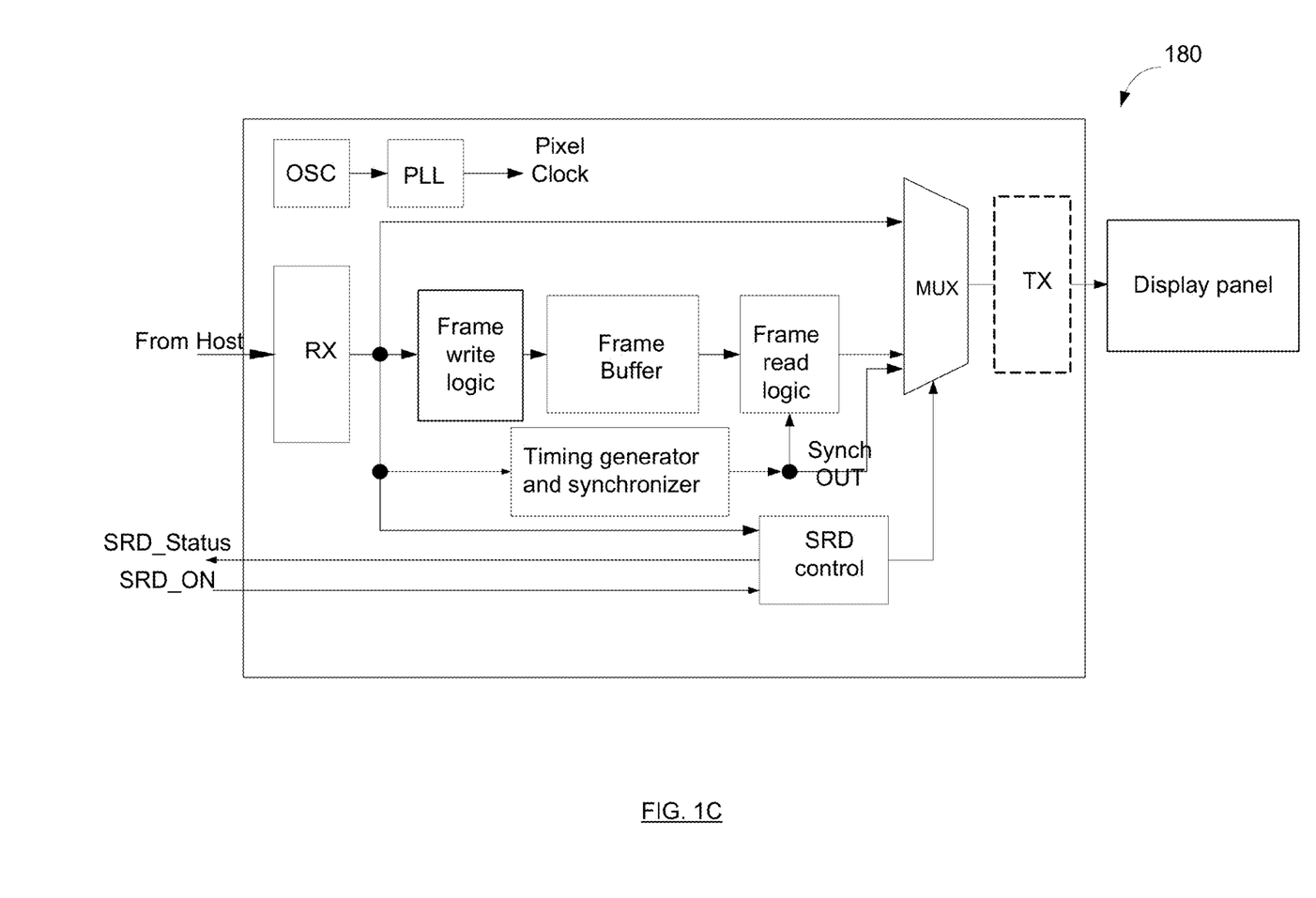
FIG. 1C depicts a high level block diagram of a timing controller for a display device in accordance with an embodiment.

FIG. 1C depicts a high level block diagram of a timing controller for a display device in accordance with an embodiment. Timing controller 180 has the capability to respond to instructions from a host device to enter a self refresh display (SRD) mode that may include powering down components and/or capturing an image and repeatedly outputting the captured image to a display. In response to signal SRD_ON from a host, SRD control block activates the frame buffer to capture a frame and the SRD control block controls the multiplexer (MUX) to transfer the captured frame to the output port. After the frame buffer captures a frame, the host may read a register in the panel that indicates that the capture has taken place and that the timing controller displays a captured image. After the signal SRD_ON is deactivated, SRD control block deactivates the frame buffer and associated logic and causes the MUX to transfer incoming video from the input port (RX in this case) to the output port (TX). Timing controller 180 may use less power because the frame buffer is turned off and the logic clock gated when the self refresh display mode is exited. In various embodiments, SRD_ON and SRD_STATUS can be signals or configured in a register.

Figure 2:
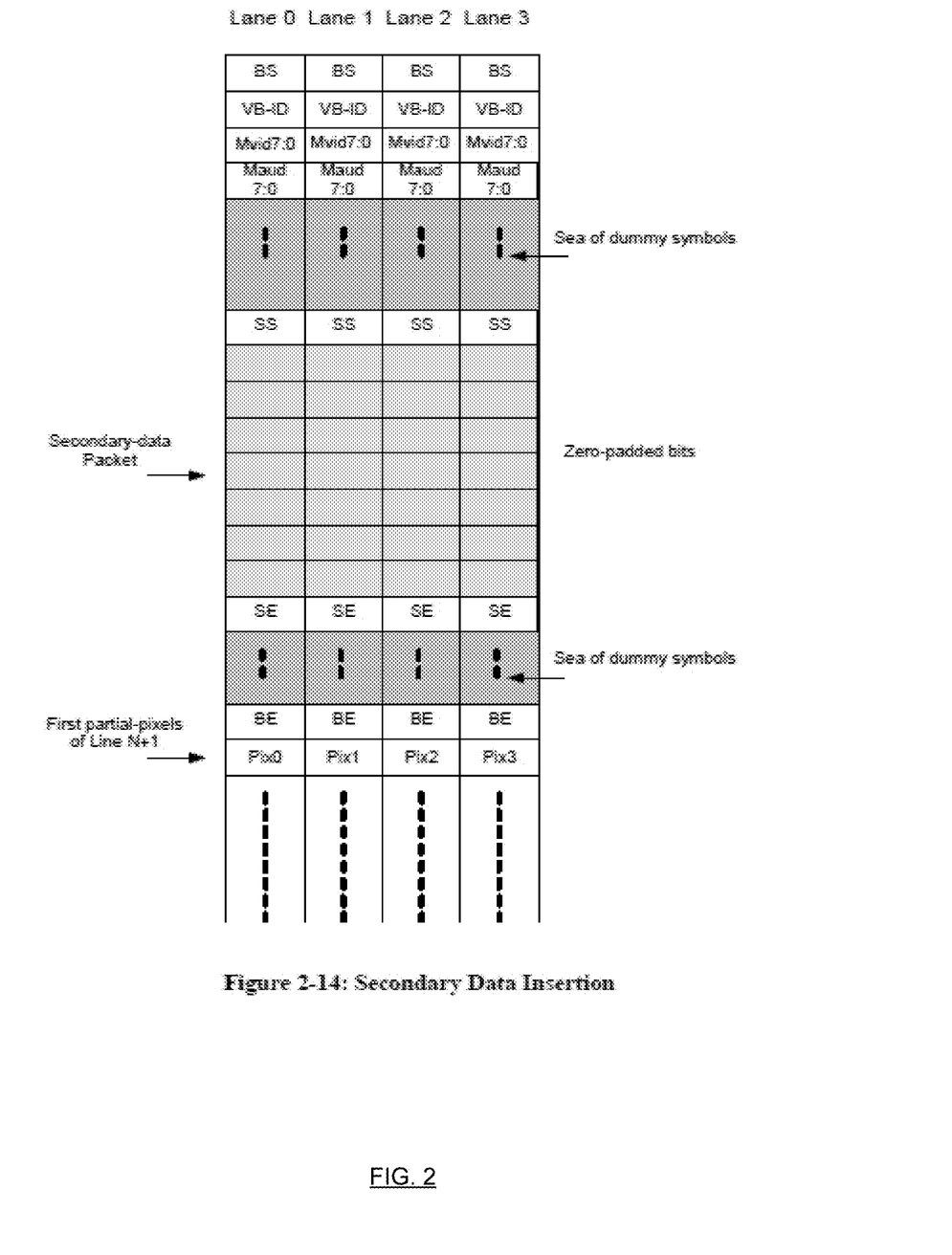
FIG. 2 depicts an example format of signals transmitted over multiple lanes of a DisplayPort interface.

FIG. 2 depicts an example format of signals transmitted over multiple lanes on a DisplayPort compatible interface. In particular, FIG. 2 reproduces FIG. 2-14 of the Video Electronics Standards Association (VESA) DisplayPort Standard, Version 1, Revision 1a (2008) (hereafter "DP1.1a specification"). However, embodiments of the present invention can be used in any version and variation of DisplayPort as well as other standards. DisplayPort specifies the availability of secondary data packets to transmit information at the vendor's discretion. Vendor-specific extension packets are a type of secondary data packet that can be used to control the display self refresh functionality over embedded DisplayPort (eDP). The basic structure of the header information for these secondary data packets is described in table 2-33 of section 2.2.5 of the DP1.1a specification, which is reproduced below in table 1.

TABLE 1

| Byte# | Content |
|---|---|
| HB0 | Secondary-data Packet ID |
| HB1 | Secondary-data Packet type |
| HB2 | Secondary-data-packet-specific header byte0 |
| HB3 | Secondary-data-packet-specific header byte1 |

Figure 3:
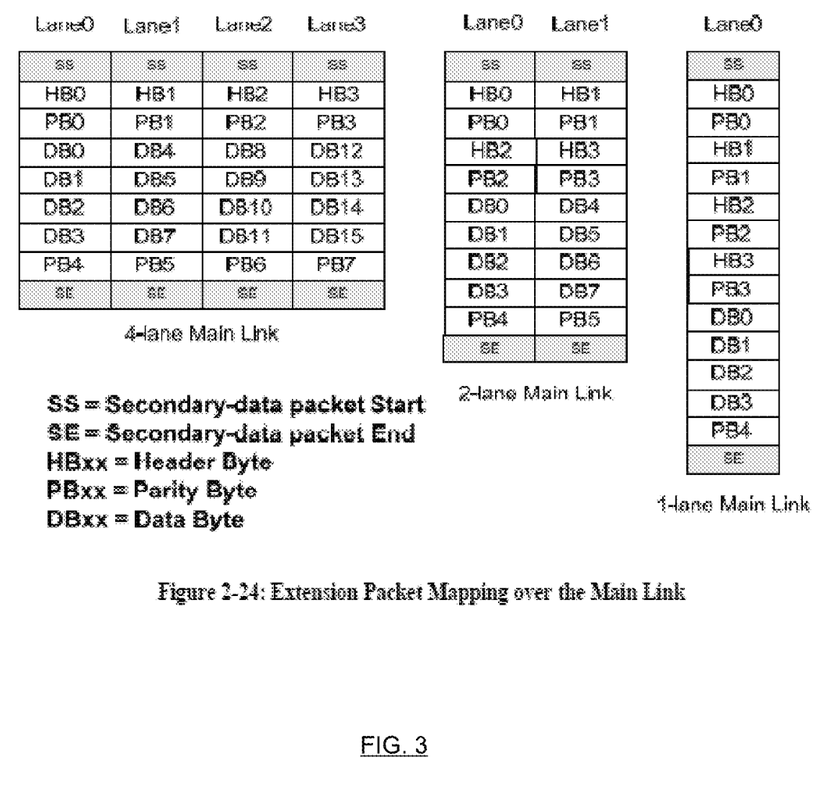
FIG. 3 depicts an example manner of communication of secondary data packets over one or more lanes of a DisplayPort interface.

FIG. 3 depicts an example manner of communication of secondary data packets over one and more lanes of a DisplayPort compatible interface. In particular, FIG. 3 reproduces FIG. 2-24 of the DP1.1a specification. As shown, secondary data packets can include header bytes, parity bytes, and data bytes.

In accordance with various embodiments, the following table provides an example of commands that can be transmitted in header bytes of secondary data packets, in accordance with various embodiments. Commands can be performed by a target device such as a display with capability to perform self refresh display.

TABLE 2

| Byte# | Example of Contents |
|---|---|
| HB0 | Specifies generation number of specification:<br>00h: Revision 0 (Haswell generation)<br>All other values reserved |
| HB1 | 04h (extension packet type indicator as defined by DP1.1a specification) |
| HB2 | Bits 0-2 used for controls<br>Bits 7:3 = Reserved (all 0's) |
| HB3 | Reserved (all 0's) |

Various embodiments provide controls in bits 0-2 of header byte HB2. Table 3 describes example commands in bits 0, 1, and 2 in header byte HB2.

TABLE 3

| Control Field Bit | Definition |
|---|---|
| B0: Frame Type | B0 = 0 means current frame is identical to the one previously sent.<br>B0 = 1 means current frame is different from the previously sent frame. |
| B1: Source SRD State | Source SRD state control field indicates the source's display controller state, which is used as a command by the target device to manage its local controller.<br>B1 = 0 means SRD_Off. Source state is such that normal display processing occurs and the eDP link remains active.<br>B1 = 1 means SRD_On. Source state is such that normal display processing may be disabled and the eDP link may be placed in standby. |
| B2: Link Standby Enable | B2 = 0 means main link to remain in normal active state.<br>B2 = 1 enables main link to enter standby state. |

Bit B0 indicates whether a frame to be sent to a target device has not changed from a previous frame that was sent to the target device. Bit B0 indicates whether a target device is to store an incoming image in a buffer. The target device can be a display with capability to enter self refresh display mode and display an image from a buffer. Bit B0 can be used where an application is to update an image on a display. An update can be made to wakeup a panel and tell the panel that one or more modified frame(s) are to be transmitted to the display and to store the frames. After storing the frames, the display and display system can return to low power state and the display system can use the updated frame for self refresh display.

Bit B1 indicates whether the target device is to enter self refresh display mode or remain in normal operation. Bit B1 also indicates whether normal display processing occurs and the link between the source and target device remains in normal active state.

Bit B2 indicates whether to power down a main link. For example, the main link can be a differential pair wire having connectors, d+ and d−. The link can transmit RGB content or other types of content. The link can be powered down or enter lower power mode.

Standard Embedded DisplayPort implementations support two link states: (1) full on ("Normal Operation") in which video data is transmitted to a panel and (2) full off ("ML Disabled") in which a lid is closed on a laptop and the display interface is turned off because video is not required. The standard Embedded DP implementation also supports an intermediate set of training-related transitional states. SRD adds an additional state: "ML Standby." State "ML Standby" enables a receiver to implement additional power management techniques for additional power reductions. For example, a receiver bias circuitry and PLLs can be turned-off. For example, components described with regard to FIG. 1B can enter lower power state or turn-off. State "ML Standby" can turn off a display interface and display link but use an image stored in panel for SRD.

Figure 4:
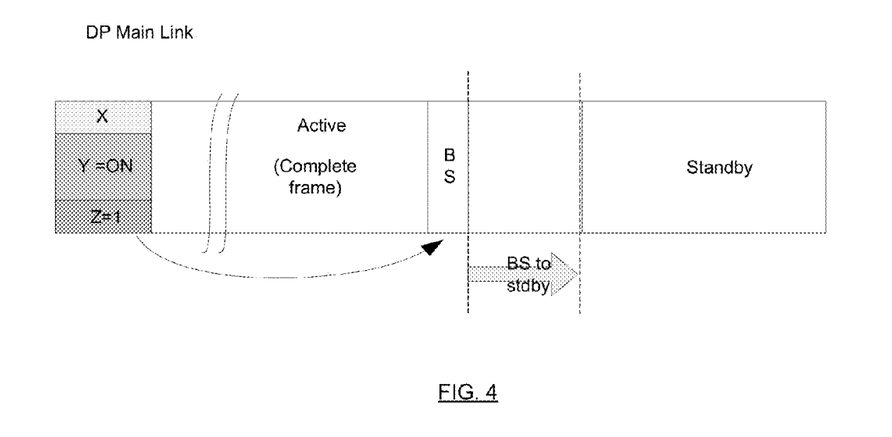
FIG. 4 depicts an example of a sequence of events for entry into main link standby mode.

FIG. 4 depicts an example of a sequence of events for entry into ML standby mode. A DisplayPort main link can be used to transmit signals X, Y, and Z. In some embodiments, header byte HB2 can be used to transmit signals X, Y, and Z. Signal X represents whether the current frame, that is to be transmitted after a VBI, is modified or unmodified relative to a previously transmitted frame. In this example, the value of signal X can indicate that the current frame is modified or unmodified relative to the previously transmitted frame. In this example, it does not matter whether frame is modified or unmodified. Signal Y indicates whether SRD is on or off. In this case, signal Y indicates that SRD state is ON. Signal Z indicates whether a link standby entry is to occur. In this case, signal Z indicates link standby is to be entered.

In some embodiments, header byte HB2 can be used to transmit signals X, Y, and Z. To transmit X, Y, and Z, the following scheme can be used: bit B0 represents X, bit B1 represents Y, and bit B2 represents Z.

Segment "Active" can include RGB color data for transmission to a display. Segment "BS" can indicate a start of a vertical blank interval in the system. Segment "BS to stdby" indicates a delay between a start of a vertical blank interval and a start of standby mode.

Figure 5:
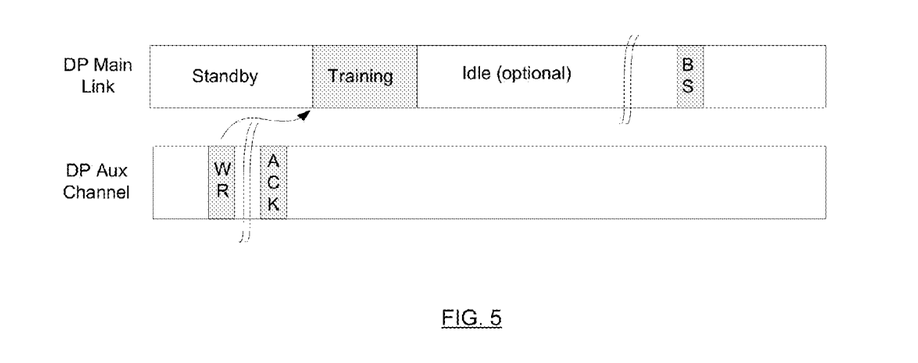
FIG. 5 depicts an example of a sequence of events for exit from main link standby mode.

FIG. 5 depicts an example of a sequence of events for exit from ML standby mode. In particular, states of the main link and auxiliary channel are described. The main link state is in state "Standby." The source initiates ML Standby exit using an AUX channel to transmit a write operation. Command WR can be used to write to register address location 00600h to wake up the target device and cause the target device to exit ML standby mode. Other register address locations can be used. The target device monitors location 00600h and wakes up on reading a wake up command in that location. After some delay, the target device transmits command ACK to the host using an AUX channel to indicate acknowledgement of receipt of the WR command. The length of the delay between receipt of WR and transmission of ACK can be defined by the DisplayPort Specification.

On detecting the write event, the target device power-ups the main link receiver and re-enters the training state to be ready for link training. Accordingly, as shown, the main link enters the state "Training." Re-entering the training state after exiting standby mode without explicit command provides faster synchronization. After the source completes sending the write transaction, the source may initiate link training. The transmitter may initiate either full training or Fast Link Training as described in the DP specification. A target device could be turned off and lose awareness of need to train when it wakes up. Causing the target device to train immediately after exiting standby allows full power down of a DP receiver.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
   receiving, at a display controller, at least one command in a header byte of a secondary data packet, wherein the secondary data packet is in compliance with a DisplayPort specification and the at least one command comprises: an indication of whether a frame is unchanged from another frame sent prior to the frame and provides the same image data as that of the another frame or changed from the another frame and provides different image data as that of the another frame, a command to enter self refresh mode, and a command to reduce power of a link and wherein a single bit represents at least one command;
   receiving, at the display controller, the frame associated with the at least one command; and
   requesting, at the display controller, performance of an action based on the at least one command, wherein in response to enabled self refresh mode and an indication that a frame is changed from another frame, performance of an action based on the at least one command comprises:
      storing the changed frame associated with the command into a buffer and maintaining self refresh mode while using the stored changed frame for self refresh.

2. The method of claim 1, wherein when the at least one command comprises an indication that a frame is changed from the another frame, performance an action based on of the at least one command comprises:
   a display system exiting lower power mode prior to the storing the frame; and
   the display system entering lower power mode after the storing the frame.

3. The method of claim 1, wherein when the at least one command comprises a command to reduce power of a link, performance of an action based on the at least one command comprises:
reducing power of a main link.

4. The method of claim 1, wherein each of the at least one command is stored in a different bit of header byte HB2 as defined in section 2.2.5 of the DisplayPort version 1.1a.

5. The method of claim 1, further comprising:
receiving the frame after a vertical blanking interval.

6. A system comprising:
a display;
a memory device;
an interface, the interface to receive at least one command in a header byte of a secondary data packet, wherein the secondary data packet is in compliance with a DisplayPort specification, wherein the at least one command comprises: an indication of whether a frame is unchanged from another frame sent prior to the frame and is to provide the same image data as that of the another frame or whether the frame is changed from another frame and is to provide different image data than that of the another frame, a command to enter self refresh mode, and a command to reduce power of a link, and wherein a different bit is to represent each command and wherein the interface is to receive the frame associated with the at least one command; and
a controller of the display, the controller to perform an action based on the at least one command, wherein in response to enabled self refresh mode and an indication that a frame is changed from another frame, the controller is to store the changed frame associated with the command into a buffer and to maintain a self refresh mode with use of the stored changed frame for self refresh.

7. The system of claim 6, wherein when the at least one command comprises an indication that a frame is changed from the another frame, the controller is to request:
exit from lower power mode prior to storage of the frame into the buffer; and
enter lower power mode after storage of the frame into the buffer.

8. The system of claim 6, wherein when the at least one command comprises a command to reduce power of a link, the controller is to request:
reduction of power of a main link.

9. The system of claim 6, wherein each of the at least one command is stored in a bit of header byte HB2 as defined in section 2.2.5 of the DisplayPort version 1.1a.

10. The system of claim 6, wherein the interface is to receive the frame after a vertical blanking interval.

11. The system of claim 6, further comprising a host system to transmit the secondary data packet to the interface.

12. At least one non-transitory computer-readable medium comprising instructions stored thereon, which when executed by a computer, cause the computer to:
receive at least one command in a header byte of a secondary data packet, wherein the secondary data packet is in compliance with a DisplayPort specification and the at least one command comprises: an indication of whether a frame is unchanged from another frame sent prior to the frame and provides the same image data as that of the another frame or whether the frame is changed from the another frame and provides different image data than that of the another frame, a command to enter self refresh mode, and a command to reduce power of a link;
receive the frame associated with the at least one command; and
request performance of an action based on the at least one command, wherein in response to enabled self refresh mode and an indication that a frame is changed from another frame, the action comprises storage of the changed frame associated with the command into a buffer and maintain a self refresh mode with use of the stored changed frame for self refresh.

13. The medium of claim 12, wherein
when the at least one command comprises an indication that a frame is not unchanged from another frame, the at least one command requests:
exit from lower power mode,
storage of the frame associated with the command into a buffer, and
entrance into lower power mode; and
when the at least one command comprises a command to reduce power of a link, the at least one command requests reducing power of a main link.

14. The medium of claim 12, wherein each of the at least one command is stored in a bit of header byte HB2 as defined in section 2.2.5 of the DisplayPort version 1.1a.

* * * * *